United States Patent
Wang et al.

(10) Patent No.: US 7,612,516 B2
(45) Date of Patent: Nov. 3, 2009

(54) MEASURING METHOD AND SYSTEM FOR CNC MACHINE

(75) Inventors: Shih-Ming Wang, Tao-Yuan (TW); Jr-Hau Chen, Tao-Yuan (TW); Jung-Ji Wang, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 221 days.

(21) Appl. No.: 11/836,843

(22) Filed: Aug. 10, 2007

(65) Prior Publication Data

US 2008/0234852 A1 Sep. 25, 2008

(30) Foreign Application Priority Data

Mar. 23, 2007 (TW) .............................. 96110042 A

(51) Int. Cl.
*G05B 19/33* (2006.01)

(52) U.S. Cl. .................. 318/575; 318/652; 318/568.19

(58) Field of Classification Search ................ 318/575, 318/568.19, 652, 560, 569, 649, 574, 474.01
See application file for complete search history.

(56) References Cited

U.S. PATENT DOCUMENTS

| 4,435,905 | A | 3/1984 | Bryan |
| 5,428,446 | A | 6/1995 | Ziegert et al. |
| 2006/0108877 | A1* | 5/2006 | Tegel .......................... 310/12 |

* cited by examiner

*Primary Examiner*—Karen Masih
(74) *Attorney, Agent, or Firm*—WPAT, PC; Justin King

(57) ABSTRACT

This invention discloses a method and system for measuring a CNC machine. The system comprises a platform, a driving module, a set of optical scales, and a detection module. The platform is driven by the driving module. In addition, the driving module further comprises a set of encoders. As the driving module drives the platform to move to a position by a first displacement, the encoders indicate the first displacement. The optical scales indicate a second displacement by which the platform is driven by the driving module. The detection module detects the difference between the first displacement and the second displacement.

18 Claims, 4 Drawing Sheets

MEASURING METHOD AND SYSTEM FOR CNC MACHINE

BACKGROUND OF THE INVENTION

1. Field of the Invention

The present invention generally relates to a measuring method and system, especially a method for measuring a CNC machine tool and the system thereof.

2. Description of the Prior Art

There are two types of errors in a contour-following motion of a multi-axis feed drive system: (1) tracking error; and (2) contour error. As shown in FIG. 1, $P_d$ is the current theoretical position and Pa is the actual position with respect to $P_d$. A tracking error (i.e. a positional error) is a difference between an input position and an actual position in single-axial motion. A contour error is an error $\epsilon$ between a motion path and an originally designed path due to disharmony in multi-axis motion; in other words, it is the minimum distance from the response point of the actual position to the desired path. Thus, a contour error is determined by creating a motion from the response point of the actual position towards the designed trajectory in the normal direction.

In terms of applications, the multi-axis contour following motion may include point-to-point drilling or boring. In these cases, machining precision of the position error is the main concern while the effect of the contour error on machining precision is relatively indifferent. On the other hand, applications such as milling and turning, machining precision is closely related to the trajectory during machining, that is, the so-called contour error is far more important than the single-axis tracking error. Here, a displacement for each axis is created by a simultaneous moving path. When the position error for each axis causes the contour error of the simultaneous moving path to occur, the contour error is compensated using a cross-coupled controller, which generates an adjustment value for each axis and feedback the adjustment values to respective axes, such that each axis has a new displacement. This process is repeated until the required contour precision is achieved.

A motion error created by a platform of a CNC machine tool can be measured by instruments, for example, linear tools, laser interferometers and multifaceted polygonal mirrors. U.S. Pat. No. 6,049,377 discloses a six-axis laser measuring system that can measure six types of positioning errors of a linearly moving platform all at once.

U.S. Pat. No. 4,435,905 discloses a double ball bar (DBB) measuring tool for measuring both static and dynamic errors when a platform is driven to move in a circular path by a CNC machine tool. This measuring tool comprises a extension rod and a pair of gage balls at either end of the extension rod. The displacement change between the two gage balls can be measured by a linear variable differential transformer (LVDT). During measurement, the two gage balls are driven in circular motion, wherein the change in distance between the two gage balls reflects the static and dynamic errors when the platform is driven in circular motion. The measuring results of the DBB measuring tool helps determining static and dynamic motion errors of the linear axis of the CNC machine tool. Errors such as pitch error, squareness error, lost-motion error, clearance error, driver gain error and stick-slip error can be measured. This DBB measuring tool is now only applicable in measuring static and dynamic errors of two linear axes.

U.S. Pat. No. 5,428,446 describes a laser ball bar (LBB) measuring tool comprising a laser measuring device on an extension rod. Thus, the range of measurement for LBB is wider than a LVDT DBB measuring tool.

The abovementioned measuring systems for single- or multi-axis feed machine tools are usually expensive and difficult to operate. Machine tool manufactures need to spend a considerable amount of money to buy these expensive measuring systems, thus raising the cost of the machine tools.

SUMMARY OF THE INVENTION

In view of the prior art and the needs of the related industries, the present invention provides a system and method for measuring a CNC machine tool that solves the abovementioned shortcomings of the conventional CNC machine tool measuring systems and methods.

One objective of the present invention is to provide a system and method for measuring a CNC machine tool that reduces the cost for buying a measuring system for the CNC machine tool.

According to the above and other objectives, the present invention provides a system for measuring a CNC machine tool, including a platform, a driving module, a set of optical scales and a detection module. The platform is driven by the driving module. In addition, the driving module further comprises a set of encoders. As the driving module drives the platform to move to a position by a first displacement, the encoders indicate the first displacement. The optical scales indicate a second displacement that the platform is driven by the driving module. The detection module detects the difference between the first displacement and the second displacement, wherein the difference corresponds to the designated position.

The present invention further provides a method for measuring a CNC machine tool. First, a platform is driven by a driving module to a designated position by a first displacement, wherein the driving module simultaneously makes a second displacement. Then, the second displacement is obtained by a set of encoders in the driving module. Then, the first displacement is obtained by a set of optical scales, wherein the first displacement is measured by the optical scales during platform movement. Finally, the first displacement and the second displacement are compared to obtain a difference between them, wherein the designated position corresponds to the difference.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

The present invention is directed to a method and system for measuring a CNC machine tool. Detailed steps and constituents are given below to assist in the understanding the present invention. Obviously, the implementations of the present invention are not limited to the specific details known by those skilled in the art of method and system for measuring a CNC machine tool. On the other hand, well-known steps or constituents of digital watermarking are not described in details in order not to unnecessarily limit the present invention. Detailed embodiments of the present invention will be provided as follow. However, apart from these detailed descriptions, the present invention may be generally applied to other embodiments, and the scope of the present invention is thus limited only by the appended claims.

Figure 1:
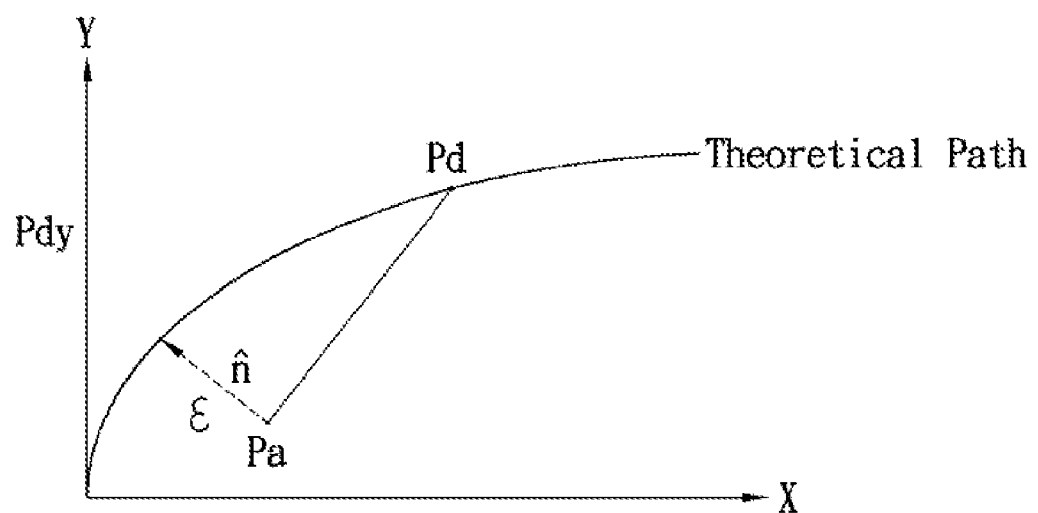
FIG. 1 is a diagram illustrating the difference between a tracking error and a contour error.
Figure 2:
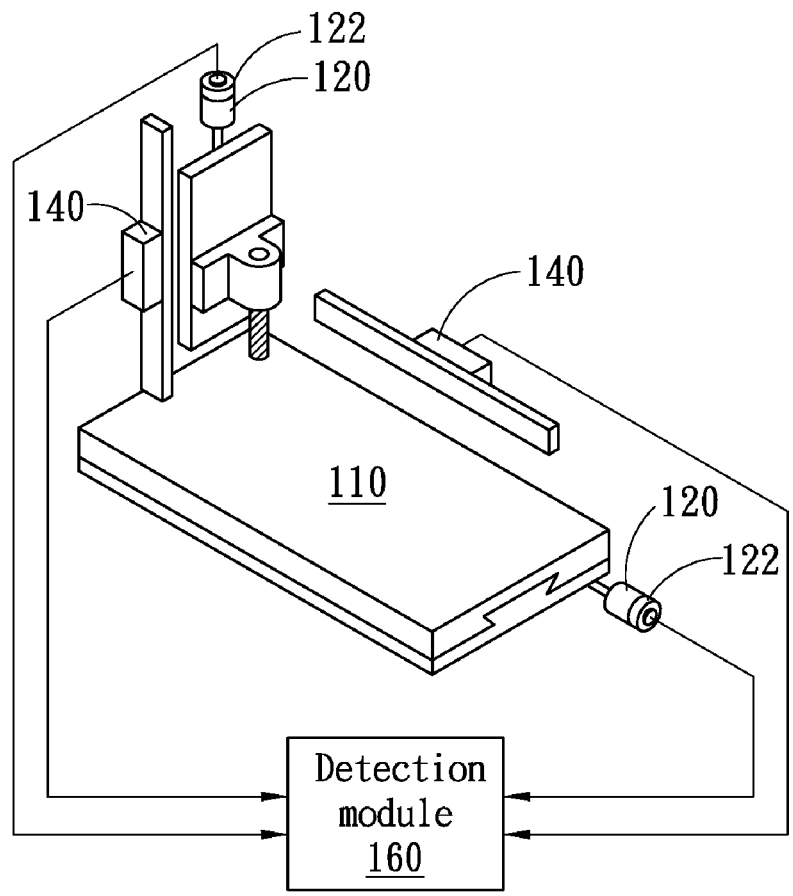
FIG. 2 is a schematic diagram depicting a CNC machine tool measuring system according to an embodiment of the present invention.

Referring to FIG. 2, a CNC machine tool measuring system 100 of a first embodiment of the present invention is shown. The measuring system 100 includes a platform 110, a driving module 120, a set of optical scales 140 and a detection module 160. The platform 100 is driven by the driving module. In addition, the driving module further comprises a set of encoders 122. As the driving module 120 drives the platform 110 to move to a position by a first displacement, the encoders 122 indicate the first displacement. The optical scales 140 indicate a second displacement that the platform 110 is driven by the driving module 120. The detection module 160 detects the difference between the first displacement and the second displacement, wherein the difference corresponds to a designated position. The driving module can be a servo motor. The detection module 160 can be a programmable logic controller (PLC).

The optical scales can be transmissive or reflective; the present invention is not limited to these. The optical scales are transparent plates made of glass having numerous equidistant parallel lines. A fixed longer piece is called a main grating scale, the other movable one called the secondary grating scale. When a light source emits towards the light-transmissive moving grating scale and projects onto the primary grating scale, light passes straight through at places where there is no graduation to four phototubes. The light intensity received by the four phototubes is influenced by the shading band, which has a lateral speed greater than that of the moving grating scale. Thus, the phototubes respond to light changes, in which a signal is amplified and adjusted for display. The four phototubes are used to determine whether the secondary grating scale moves left or right. The signal can be further divided, for example, the pitch between parallel lines is 7 μm, and an accuracy of 1 μm can be obtained after the signal dividing process.

Figure 3:
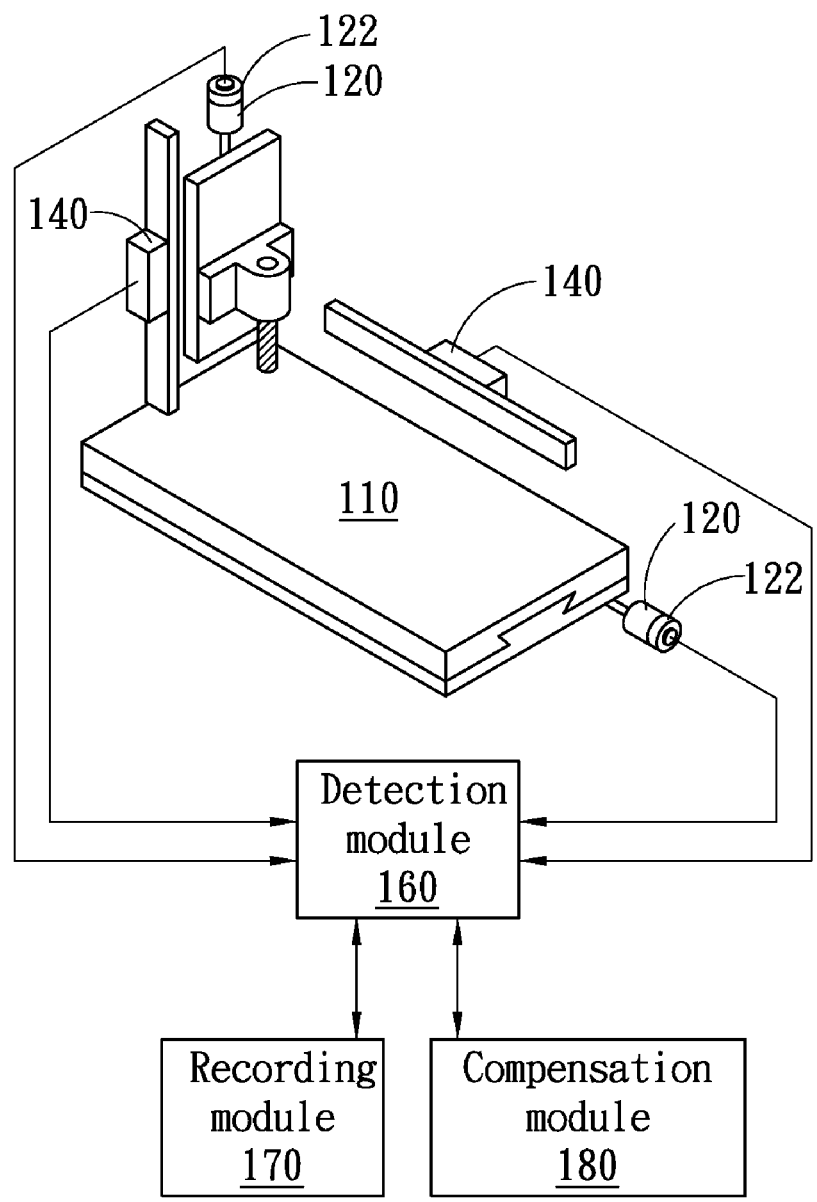
FIG. 3 is a schematic diagram depicting a CNC machine tool measuring system according to another embodiment of the present invention.

As shown in FIG. 3, a CNC machine tool measuring system of a preferred embodiment of the present invention further includes a recording module 170 for recording designated positions and the differences corresponding to the designated positions. The recording module 170 records the difference corresponding to each designated position. Moreover, the CNC machine tool measuring system further includes a compensation module 180. When the driving module attempts to drive the platform to a designated position, the compensation module 180 instructs the driving module to drive the platform by certain displacement, which is the difference that corresponds to the designated position.

The recording module 170 may be a processor, for example a 8051, 8052, 8031 or 8032 chip. The recording module 170 records the designated positions and the differences corresponding to the designated positions and establishes a database for subsequent maintenance of the CNC machine. In addition, the recording module is not limited to the 8051 single chip, but can be multi-chip or other module or processor.

In another embodiment of the present invention, the driving module further includes a first driving module and a second driving module. The first driving module drives the platform to move in a lateral direction, while the second driving module drives the platform to move in a longitudinal direction. Furthermore, the driving module further includes a set of encoders: first and second encoders. The first encoder indicates a first lateral displacement by which the platform is driven by the first driving module, while the second encoder indicates a first longitudinal displacement by which the platform is driven by the second driving module.

Another embodiment of the present invention is a method for measuring a CNC machine tool. First, a platform is driven by a driving module to a designated position by a first displacement, wherein the driving module simultaneously makes a second displacement. Then, the second displacement is obtained by a set of encoders in the driving module. Then, the first displacement is obtained by a set of optical scales, wherein the first displacement is measured by the optical scales during platform movement. Finally, the first displacement and the second displacement are compared to obtain a difference between them, wherein the designated position corresponds to the difference.

The abovementioned method for measuring a CNC machine tool further includes a recording module for recording designated positions and the differences corresponding to the designated positions. The recording module records the difference corresponding to each designated position. Moreover, the method for measuring a CNC machine tool further includes a step of causing a compensation module to instruct the driving module to drive the platform by certain displacement, which is the difference that corresponds to the designated position, when the driving module attempts to drive the platform to a designated position.

In a preferred embodiment of the present invention, the driving module further includes a first driving module and a second driving module. The first driving module drives the platform to move in a lateral direction, while the second driving module drives the platform to move in a longitudinal direction. Furthermore, the driving module further includes a set of encoders: first and second encoders. The first encoder indicates a first lateral displacement by which the platform is driven by the first driving module, while the second encoder indicates a first longitudinal displacement by which the platform is driven by the second driving module.

In another preferred embodiment of the present invention, the optical scales further include a first optical scale and a second optical scale. The first optical scale measures a second lateral displacement by which the platform is driven by the first driving module, while the second optical scale measures a second longitudinal displacement by which the platform is driven by the second driving module.

CNC machines tool critically relies on accuracy and speed, but since the CNC machine tool is a half-closed loop control system, i.e. feedback compensating signal is sent out only by the encoder of the motor, the CNC control system can only carry out positioning control of the motor. As for machine tool assembly error, compensation is not possible. In an example of the present invention, optical scales embedded in the machine tool can directly feedback signals to the PLC as compensation, which greatly improves machining accuracy of the machine tool. However, since the PLC may experience delay during executions, and that PLC can only execute logical operations but not store data, the PLC can be combined with the 8051 chip to achieve fast operations while allowing data storage.

Figure 4:
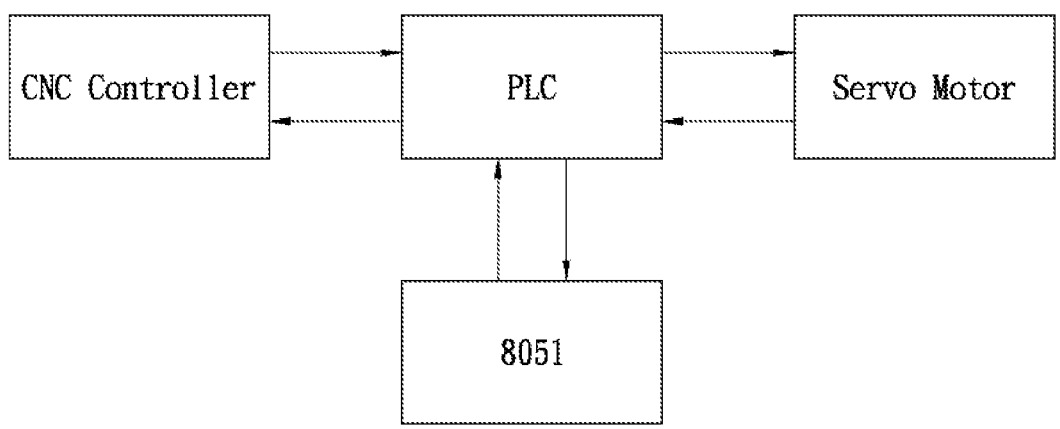
FIG. 4 is a diagram illustrating operations of a CNC machine tool.

FIG. 4 is a schematic diagram illustrating operations of a machine tool combined with a 8051 chip. Similar to conventional CNC machine tools, a CNC controller sends instruction to the PLC, such that the PLC subtracts the coordinates of the theoretical location of the platform with the coordinates of the actual location measured by the optical scales to obtain the error of the machine tool used for compensation. The compensation accuracy depends on the accuracies of the optical scales and the motor. Meanwhile, the 8051 chip may record the error for each position and establishes a database for maintenance of the machine tool in later days.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A Computer Numerical Control (CNC) machine tool measuring system, including:
   a platform;
   a driving module comprising a set of encoders, wherein the driving module drives the platform to move to a designated position by a first displacement indicated by the set of encoders;
   a set of optical scales for indicating a second displacement by which the platform is driven by the driving module; and
   a detection module for detecting a difference between the first displacement and the second displacement, wherein the difference corresponds to the designated position.

2. A CNC machine tool measuring system of claim 1, further including a recording module for recording the designated position and the difference that corresponds to the designated position.

3. A CNC machine tool measuring system of claim 2, wherein the designated position includes several designated positions, and the recording module records the difference corresponds to each respective designated position.

4. A CNC machine tool measuring system of claim 2, further including a compensation module for instructing the driving module to drive the platform by a certain displacement of the difference that corresponds to the designated position.

5. A CNC machine tool measuring system of claim 1, wherein the detection module is a programmable logic controller (PLC).

6. A CNC machine tool measuring system of claim 1, wherein the driving module further includes a first driving module and a second driving module, the first driving module driving the platform to move in a lateral direction, while the second driving module driving the platform to move in a longitudinal direction.

7. A CNC machine tool measuring system of claim 6, wherein the set of encoders further include first and second encoders, the first encoder indicating a first lateral displacement by which the platform is driven by the first driving module, while the second encoder indicating a first longitudinal displacement by which the platform is driven by the second driving module.

8. A CNC machine tool measuring system of claim 6, wherein the set of optical scales further include a first optical scale and a second optical scale, the first optical scale measuring a second lateral displacement by which the platform is driven by the first driving module, while the second optical scale measuring a second longitudinal displacement by which the platform is driven by the second driving module.

9. A CNC machine tool measuring system of claim 1, wherein the driving module is a servo motor.

10. A method for measuring a CNC machine tool, including:
    driving a platform to move to a designated position by a first displacement by a driving module, wherein the driving module simultaneously makes a second displacement;
    obtaining the second displacement by a set of encoders in the driving module;
    obtaining the first displacement by a set of optical scales, wherein the set of optical scales measure the first displacement during platform movement; and
    comparing the first displacement and the second displacement to obtain a difference therebetween, wherein the difference corresponds to the designated position.

11. A method for measuring a CNC machine tool of claim 10, further including recording the designated position and the difference that corresponds to the designated position by a recording module.

12. A method for measuring a CNC machine tool of claim 11, wherein the designated position includes several designated positions, and the recording module records the difference corresponds to each respective designated position.

13. A method for measuring a CNC machine tool of claim 11, further including instructing the driving module to drive the platform by a certain displacement of the difference that corresponds to the designated position by a compensation module.

14. A method for measuring a CNC machine tool of claim 10, wherein the detection module is a programmable logic controller (PLC).

15. A method for measuring a CNC machine tool of claim 10, wherein the driving module further includes a first driving module and a second driving module, the first driving module driving the platform to move in a lateral direction, while the second driving module driving the platform to move in a longitudinal direction.

16. A method for measuring a CNC machine tool of claim 15, wherein the set of encoders further include first and second encoders, the first encoder indicating a first lateral displacement by which the platform is driven by the first driving module, while the second encoder indicating a first longitudinal displacement by which the platform is driven by the second driving module.

17. A method for measuring a CNC machine tool of claim 15, wherein the set of optical scales further include a first optical scale and a second optical scale, the first optical scale measuring a second lateral displacement by which the platform is driven by the first driving module, while the second optical scale measuring a second longitudinal displacement by which the platform is driven by the second driving module.

18. A method for measuring a CNC machine tool of claim 10, wherein the driving module is a servo motor.

* * * * *